United States Patent [19]

Cook et al.

[11] Patent Number: 4,582,088
[45] Date of Patent: Apr. 15, 1986

[54] THREE PORT SOLENOID VALVE

[75] Inventors: John E. Cook; Ronald F. Mitchell; Gary M. Bruneel, all of Chatham, Canada

[73] Assignee: Allied Corporation, Morris Township, Morris County, N.J.

[21] Appl. No.: 853,646

[22] Filed: Sep. 21, 1984

[51] Int. Cl.[4] .......................................... F15B 13/044
[52] U.S. Cl. ............................ 137/625.65; 137/625.5; 251/129.14; 251/129.15
[58] Field of Search ..................... 137/625.5, 625.65; 251/141

[56] References Cited

U.S. PATENT DOCUMENTS

| 3,422,850 | 1/1969 | Caldwell | 137/625.65 |
| 3,937,242 | 2/1976 | Eckert | 137/625.65 X |
| 3,961,644 | 6/1976 | Eckert | 137/625.65 |
| 4,211,257 | 7/1980 | Sakakibara et al. | 137/625.65 |
| 4,326,696 | 4/1982 | Ishikawa et al. | 137/625.65 |
| 4,501,299 | 2/1985 | Klimowicz et al. | 137/625.65 |

FOREIGN PATENT DOCUMENTS

| 251004 | 4/1964 | Australia | 137/625.65 |
| 12865 | 11/1979 | European Pat. Off. | 137/625.65 |
| 1887 | 1/1984 | Japan | 137/625.65 |

Primary Examiner—Gerald A. Michalsky
Attorney, Agent, or Firm—Markell Seitzman; Russel C. Wells

[57] ABSTRACT

A valve (10) comprising a housing (14, 16, 18) defining a plurality of ports (62, 70, 72) two of such ports terminating in opposingly spaced, axially aligned valve seats (54, 94). The valve includes an assembly comprising a coil (124) responsive to control signals and a substantially hollow armature (200) movably positioned relative to said valve seats (54, 94) in response to the magnetic force generated in response to the control signals. The armature includes seating element (212; 320) for selectively engaging either one of the valve seats (54, 94) and preventing communication therethrough, means for receiving, interior thereto, one of said valve seats (94).

3 Claims, 7 Drawing Figures

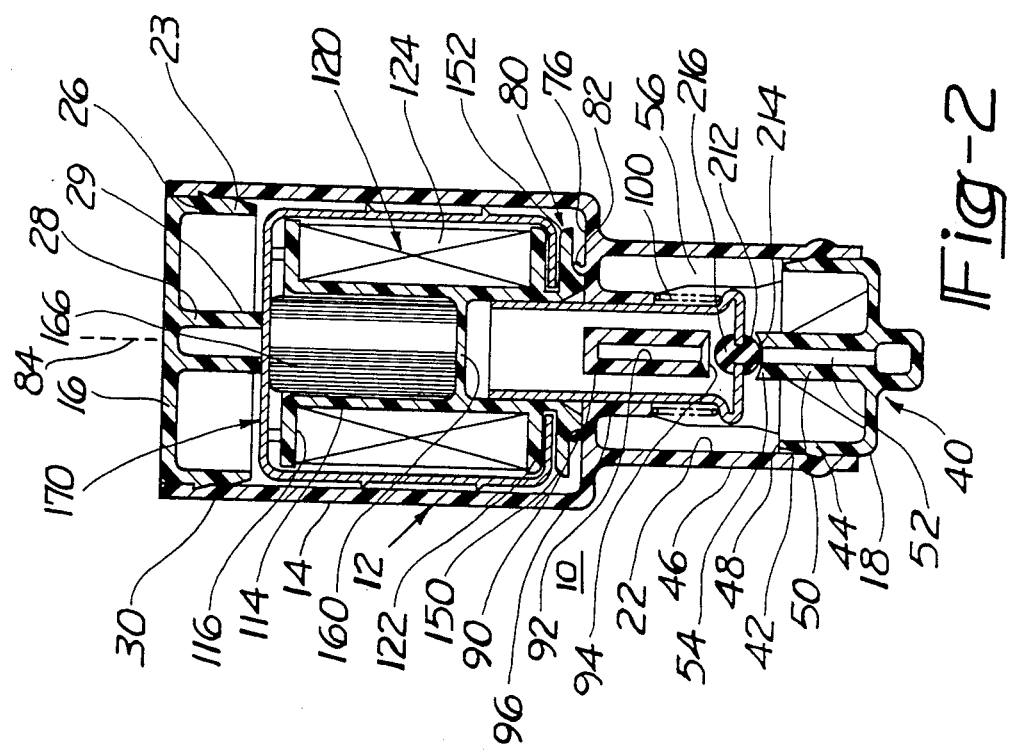
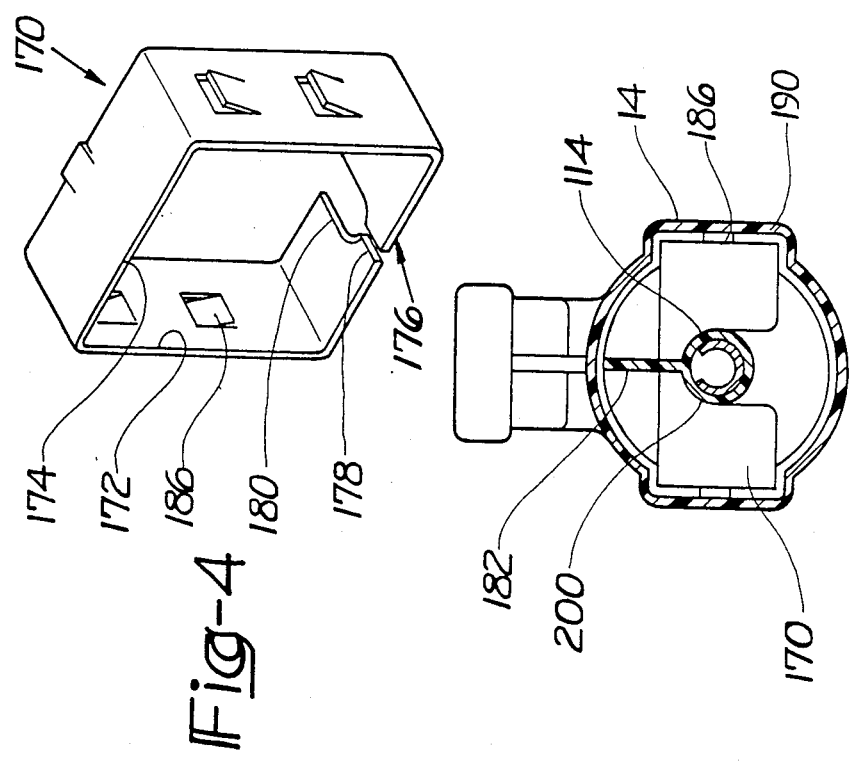

THREE PORT SOLENOID VALVE

BRIEF DESCRIPTION AND SUMMARY OF THE INVENTION

The present invention generally relates to solenoid valves and more particularly to valves which control the flow of air communicated to a pneumatic actuator.

Solenoid valves of the type hereinafter described find general application for the control of pneumatic actuators. These valves often define a pressure chamber having an input port connected to a vacuum or pressure source and an output port which is adapted to be connected to the actuator. To vary the degree of pressure within the chamber and hence the degree of pressure available to the actuator it is necessary to introduce air at a pressure different from that established by the source. Typically in automotive application the pressure source is the vacuum generated at the intake manifold of the engine and the other pressure is atmospheric pressure which is communicated to the vacuum chamber through a vent port. The vent port is often communicated to the chamber through a passage formed within the body of the solenoid and positioned remote from the inlet and output ports. This makes it impractical to use a one piece molded three (3) port connector. Further, in order to hermetically seal the vacuum chamber the various parts of the housing of the solenoid which are often manufactured of a plastic material require a sonic weld or a variety of strategically placed O-rings. The present invention provides a more efficient, cost reduced valve than found in the prior art.

It is an object of the present invention to provide a low cost, rapid responding, repeatably operating valve. A further object of the present invention is to provide a valve having three ports which are placed in close proximity to one another. Accordingly the invention comprises;

a valve comprising a housing defining a plurality of ports, two of such ports terminating in opposingly spaced, axially aligned valve seats the valve includes solenoid assembly comprising a coil responsive to control signals and a substantially hollow armature (200) movably positioned relative to the valve seats in response to the magnetic force generated in response to the control signals, the armature includes a seating element for selectively engaging either one of the valve seats and for preventing communication therethrough and means for receiving, interior thereto, one of said valve seats.

Many other objects and purposes of the invention will be clear from the detailed description of the drawings.

BRIEF DESCRIPTION OF THE DRAWINGS

In the drawings:

FIG. 2 illustrates a cross-sectional view of the valve through section 2—2 of FIG. 1.

FIG. 4 illustrates a projected view of a metallic strap utilized within the valve of FIGS. 2 and 3.

FIG. 5 illustrates cross-sectional view of the invention taken through FIG. 5—5 of FIG. 3.

DETAILED DESCRIPTION OF THE DRAWINGS

Figure 3:
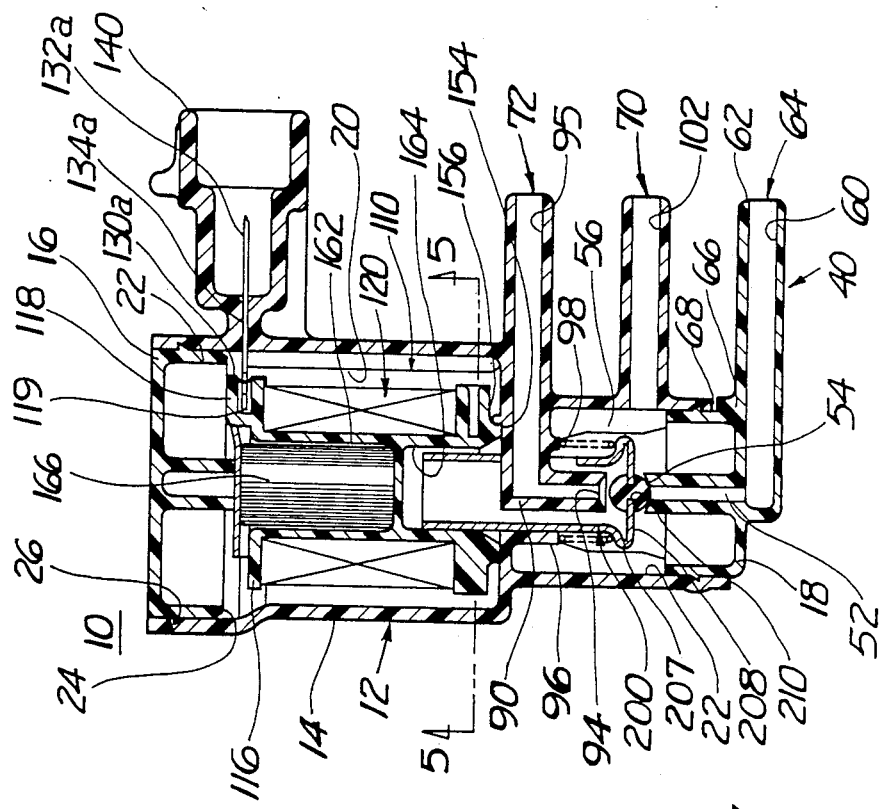
FIG. 3 illustrates another cross-sectional view of the invention taken through section 3—3 of FIG. 1.
Figure 1:
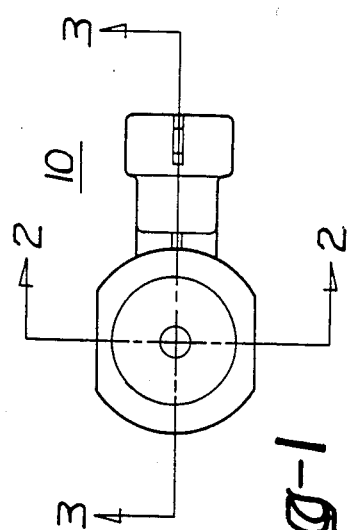
FIG. 1 illustrates a top view of a three port solenoid valve.

With reference to the FIGURES there is illustrated a three port solenoid valve 10 comprising a housing 12 comprising a main body 14 and end cap 16 and a lower housing member 18. The main body 14 is preferably fabricated of an elastomeric deformable plastic such as that manufactured by DuPont under the trade name HYTREL. The main body 14 includes an upper stepped bore 20 and a lower bore 22. The end cap 16 comprises a cylindrical member having walls 23 which terminate at an end surface 24. The outer surface of the wall 22 includes a barb 26 positioned about its outer circumference. The end cap 16 further includes an inwardly directed boss 28 which extends below the surface 24 and terminates at a surface 29. Upon insertion of the end cap 16 into the bore 20 of the main body 14 the elastomeric walls 30 of the main body deform as illustrated in the drawings to secure the end cap 16 thereto thus providing a hermetic seal to protect the interior components of the valve 10. The lower body member 18 comprises a substantially cylindrical body generally indicated as 40 having extending walls 42 which include another circumferentially extending barb 44 which when inserted within bore 22 deform the lower walls 46 of the main body 14 thus providing another hermetic seal for the pressure chamber 56 as hereinafter described. The walls 42 terminate at surface 48. The lower body member 18 further includes an inwardly extending boss 50 having a through passage 52. The boss 50 terminates at a frusto-conical seat 54. The lower body 18 further includes a radially extending passage 60 which terminates at one end 62 at a first port generally designated as 64. The port 64 may be communicated in a known manner to a source of pressure. The passage 60 intersects passage 52 thus providing communication from the port 64 through to the valve seat 54. The member 18 further includes proximate the passage 60 an axially extending projection or key 66 which is received by a coacting slot 68 fabricated within the main body 14. The key 66 and slot 68 permit the alignment of the port 64 with the remaining two ports 70 and 72.

The main body 14 is provided with a shoulder 76 which provides a substantially circular ledge onto which a bobbin 80 rests. Positioned upon the shoulder 76 is an upwardly extending flexible circular ring 82 which is positioned coaxial with an axis 84 which extends through the center of the valve seat 54. The FIGURES illustrate the ring 82 deformed by the bobbin 80 thus providing a hermetic seal for the pressure chamber 56.

The volume enclosed by the lower member 18 and the main body 14 proximate the valve seat 54 defines the pressure chamber 56.

Extending axially from the shoulder 76 is a boss 90 which includes a passage 92. The boss 90 terminates at another frusto-conical valve seat 94 which is positioned within the chamber 56 apart from the valve seat 54. The main body 14 further includes another passage 95 which terminates at one end in communication with the axial passage 92 and at its other end with the port 72. Positioned coaxial to the boss 90 is another axially directed projecting member 96 terminating at a circular land or surface 98 such land or surface 98 provides a receiving surface for a spring 100. The main body 14 further includes another passage 102 which terminates at one end at port 70 and at its other end with the pressure chamber 56. The ports 64, 70 and 72 are positioned in co-planar, parallel alignment. The port 64, as previously indicated, may be communicated to a vacuum or pressure source. The port 70 which may be designated as the output port may be communicated to a pneumatic actuator while the port 72 may be designated as a vent port and communicated to atmosphere. The upper portion of the main housing body 14, its shoulder 76 and bore 20 define a coil receiving cavity 110 into which a coil assembly generally designated as 120 is inserted. The coil assembly comprises the previously mentioned bobbin 80. The bobbin 80 is preferably non metallic and includes a centrally positioned, axially extending, substantially hollow column 114 which supports a first radially projecting disc-like member 116. Positioned above, as viewed in the FIGURES, the disc member 116 and fabricated integrally therewith is another radially projecting member 118 defining a slot 119, the purpose of which will be discussed hereinafter. The column 114 further supports a second radially extending disc-like member 122. A coil 124 is radially wound about the column 114 and is further supported by the disc members 116 and 122. The ends 130a and b of the coil 124 (only 130a is illustrated in FIG. 3) are positioned across the slot 119. A plurality of insulation displacing terminals 132a and b are received through cooperating passages 134a and b. The terminals 132 are inserted into slot 119 in engagement with the coil ends 130 provide electrical communication with the ends 130a and b of the coil. The terminals 132a and b may be protected by a radially projecting sleeve 140 which may be an integral extension of the main body 14.

The column 114 of the bobbin 80 further includes another radially extending disc-like member 150 positioned apart from the disc 122 defining a slot 152 therebetween. The column 114 terminates at an end 154 which seats upon the shoulder 76. An arcuately shaped transition surface 156 is provided in the outer portion of the disc 150. When the bobbin 80 is positioned on the shoulder 76 the transition surface 156 deforms the ring 82 thus providing a pressure tight seal therebetween. Alternatively, the bobbin 80 may be provided with a barb (not shown) to engage the ring 82 similar to the way the barb 26 engages the main body 14. The bobbin 80 further includes a radially extending member 160 which separates the interior of the column 114 into an upper bore 162 and a lower or armature receiving bore 164. Positioned upon the member 160 and extending axially beyond the end of the disc member 116 is a ferromagnetic cylinder or stator 166. The cylinder 166 is maintained within the bore 162 by a metallic strap 170 which is illustrated in greater detail in FIG. 4.

The magnetic strap 170 comprises a metallic, open rectangle having sides 172 and inwardly extending arcuately shaped top 174 and a split bottom element generally designated as 176. The bottom 176 is preferably slotted at 178 and further includes a substantially oval cut-out 180. The metallic strap 170 is received within the slot 152 formed between the discs 122 and 150. In its assembled position the top 174 is spaced from disc 116 and due to its arcuate shape spring loads the stator 166 into the bore 162. The oval cutout 180 permits the strap 170 to be positioned in surrounding, abuting relation, relative to the column 114, while the slot 178 permits the strap to be slidably received about a rib 182 (see FIG. 5) which provides additional structural support to maintain the discs 122 and 150 in their separated spaced position. The sides 172 of the strap 170 may be formed with extending tabs 186 which provide for a press fit engagement against the interior of the main body of the housing 12. The bobbin 80 is maintained within the coil receiving cavity 110 by the action of the tabs 186 against the walls of the main body 14 which provides a radially compressive force to the strap 170.

The coil assembly 120 is positioned radially within the body portion 14 by the substantially rectangular walls 190 thereof which interact with the strap 170 as shown in FIG. 5.

Positioned within the lower of armature receiving bore 164 is a slidable armature 200. The armature 200 is more clearly illustrated in FIG. 6. The armature 200 comprises a very light weight substantially cylindrical hollow member having walls 202. The walls 202 terminate at an open end 204. The wall 202 contains a substantially rectangular, axially extending slot 206 which extends through a greater portion of the wall 202. The wall 202 terminates at its other end at a flange 207 which defines a smooth transition to a bottom 208. The bottom 208 is provided with an opening 210. The bottom 208 is more clearly illustrated in FIG. 2 or 3. A one piece, compliant, valving element 212 is fitted to the bottom 208 through the opening 210 and defines a first surface 214 and a second surface 216. The surfaces 214 and 216 are preferably spherically shaped and depending upon the position of the armature 200 seat upon one of the corresponding valve seats 54 and 94. As more clearly illustrated in FIG. 2 or 3 upon assembly the armature is slidably received within the bore 164, the slot 206 permits the armature to be received in surrounding relation relative to the valve seat 94 which is formed at the end of the axially extending boss 90. The flange 207 provides a receiving surface for the spring 100 which biases the armature 200, in the absence of control signals, in a downward position (as viewed in the FIGURES) to close communication between the port 64 and the vacuum chamber 56. In operation the position of the armature 200 is modulated between the valve seats 54 and 94 to mix the higher pressure atmospheric air received at port 72 with the lower pressure vacuum received at port 64. This is achieved in a known manner by modulating the control signals received at the terminals 132.

An advantage achieved by utilizing the spherically shaped surfaces 214 and 216 to seat upon the frusto-conical valve seats 54 and 94 provides for longer wear and better engagement between the surfaces 214 and 216 and the seats 54 and 94. Further, by utilizing the spherically shaped surfaces 214 and 216 the element 212 tends to seat at the inner edge of the passages 52 and 92 thus reducing the surface area in contact with the seats 54 and 94. This reduces the pressure differential against which the electromagnetic force must operate and yields a faster acting, more repeatable valve which utilizes less current to generate magnetic forces. A further advantage of the invention is achieved by the strap 170, metallic cylinder 166 and an armature 200 which defines an improved magnetic circuit.

Figures 6, 7:
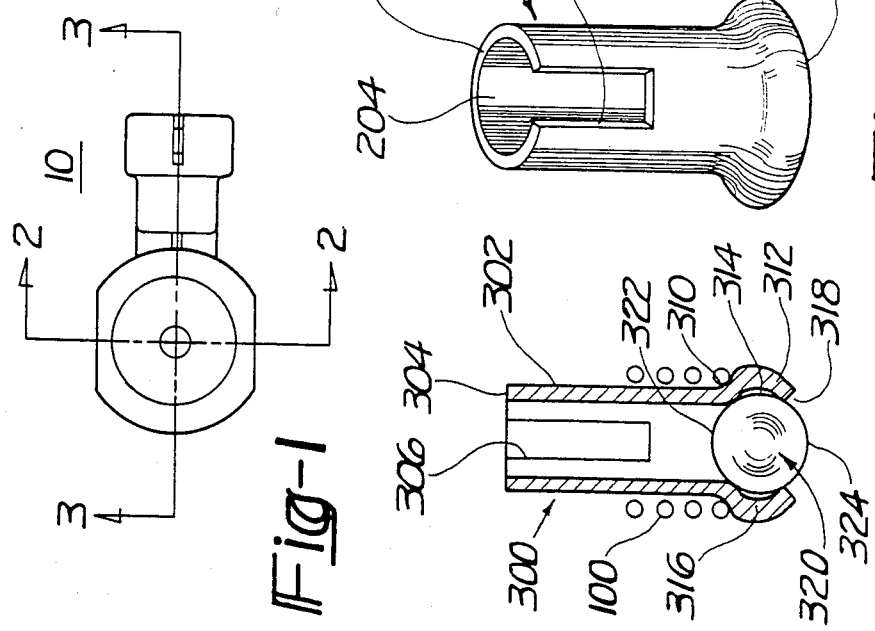
FIG. 6 illustrates a projected view of an armature used in the valve.
FIG. 7 illustrates an alternate embodiment of an armature.

With reference to FIG. 7 there is illustrated an alternate embodiment of the armature 200 which is generally designated as 300. The armature 300 comprises a hollow cylinder having a wall 302 which terminate at the first end 304. The walls further support a slot 306. The other end of the wall 302 comprises a substantially radially extending flange 310 which transitions into a inwardly extending end 312. The flange 310 and end 312 provide a receiving cavity 314 having an undercut 316. Forced into the opening 318 defined by the circular end 312 is a compliant, preferably rubber ball 320 which seats within the undercut 316 of the cavity 314. The undercut 316 maintains the ball 320 in its desired position. The ball 320 provides an alternate valving element to the element 212 described above. The upper and lower surfaces 322 and 324 respectively of the ball 320 provide the seating surfaces analogous to surfaces 214 and 216.

Many changes and modifications in the above described embodiments of the invention can, of course, be carried out without departing from the scope thereof. Accordingly, that scope is intended to be limited only by the scope of the appended claims.

We claim:

1. A valve comprising a housing defining at least three coplanar ports, at least two of such ports terminating in opposingly spaced, axially aligned passages terminating at a corresponding valve seat, positioned within a pressure chamber a solenoid or coil assembly comprising a coil responsive to control signals and a substantially hollow armature movably positioned relative to said valve seats in response to the magnetic force generated in response to the control signals including a seating element for alternatively selectively engaging either one of said valve seats and preventing communication therethrough, said armature defining a substantially hollow cylindrical body including a wall terminating at one end at an open end and terminating at the other end at a bottom oppositely positioned thereto, said wall including a cut-out or slot proximate said open end through which is received one of said passages, and wherein said bottom of said armature is reciprocatively movable relative to said valve seats.

2. The valve as defined in claim 1 wherein said bottom is formed by a second open end and said armature includes proximate said bottom an increased diameter portion for receiving a compliant ball, said ball defining a first seating surface extending beyond said second open end for seating upon one of said valve seats and another seating surface interior to said cylindrical body for seating upon the other of said valve seats associates with said one passage.

3. A valve comprising:

a multi-part housing comprising a main body portion including a shoulder and an annular member axially extending therefrom defining in concert an axially extending stepped bore, said housing further including a lower bore positioned about said axially extending member and adapted to receive a lower body member, said lower bore and said lower body member cooperating to define a pressure chamber therebetween, said stepped bore including an upper portion and a lower portion, said upper portion defining a coil receiving cavity and said lower portion defined by said axially extending member which partially extends into said pressure chamber and said axially extending member defining means for receiving and guiding a reciprocating armature;

said main body portion further including, proximate said pressure chamber, first passage means including a first radial portion and a first axial portion extending from said first radial portion into said lower portion of said stepped bore and into said pressure chamber, said first axial portion terminating at a first valve seat;

said lower body member further including second passage means including a second radial portion extending therefrom and co-planar with said first radial portion; and a second axial portion extending from said second radial portion into said pressure chamber, said second axial portion terminating at a second valve seat opposingly situated, axially aligned and spaced from first valve seat, a coil or solenoid assembly positioned within said coil receiving cavity comprising a toroidal coil wound about a core partially extending through said coil, an armature opposingly situated relative to said core and partially received within said coil and separated from an end of said core by nonmagnetic material, said armature reciprocatively received within said lower portion of said stepped bore, said armature comprising;

a hollow cylindrical body reciprocatively received within said lower portion and including a slot or cut-out sufficient to receive said first axial extending portion therethrough, a bottom movably positioned between first and said second valve seats, said bottom supporting valve means for sealing a particular one of said valve seats in response to the motion of said armature and biasing means, interposing said housing and said armature for biasing said valve means into one of said valve seats.

* * * * *

UNITED STATES PATENT AND TRADEMARK OFFICE
CERTIFICATE OF CORRECTION

PATENT NO. : 4,582,088
DATED : April 15, 1986
INVENTOR(S) : John E. Cook; Ronald F. Mitchell; Gary M. Bruneel It is certified that error appears in the above-identified patent and that said Letters Patent are hereby corrected as shown below:

On the Title Page, Item [21] should read:

[21] Appl. No.: 653,646

Signed and Sealed this

Twenty-fourth Day of March, 1987

Attest:

DONALD J. QUIGG

Attesting Officer   Commissioner of Patents and Trademarks